United States Patent [19]

Clugston

[11] 4,180,143
[45] Dec. 25, 1979

[54] STEP FOR VEHICLES

[76] Inventor: George D. Clugston, R.R. #3, Box 203, Pittsburg, Kans. 66762

[21] Appl. No.: 926,864

[22] Filed: Jul. 21, 1978

[51] Int. Cl.² ................................................ B60R 3/02
[52] U.S. Cl. ...................................... 182/91; 280/166
[58] Field of Search ................. 182/88, 91, 95, 96, 182/92; 280/166, 164, 163

[56] References Cited

U.S. PATENT DOCUMENTS

| | | | |
|---|---|---|---|
| 1,184,383 | 5/1916 | Roebuck et al. | 182/88 |
| 2,487,660 | 4/1949 | McCann | 182/96 X |
| 2,575,615 | 11/1951 | Crump | 182/95 |
| 2,764,422 | 9/1956 | McDonald | 182/96 X |
| 3,172,499 | 3/1965 | Stairs | 182/88 X |
| 3,392,990 | 7/1968 | Wolf | 280/166 X |
| 3,817,554 | 6/1974 | Cutte et al. | 182/88 X |
| 3,853,369 | 12/1974 | Holden | 280/163 X |
| 3,865,399 | 2/1975 | Way | 280/166 X |
| 3,889,997 | 6/1975 | Schoneck | 280/166 X |
| 3,961,809 | 6/1976 | Clugston | 280/166 |

Primary Examiner—John A. Pekar
Assistant Examiner—Norman L. Stack, Jr.

Attorney, Agent, or Firm—Schmidt, Johnson, Hovey & Williams

[57] ABSTRACT

A safety step assembly for use with vehicles such as trucks or the like is provided with spring biased mounting brackets to removably mount the step assembly on a vehicle without resort to permanent attachment means, and includes spring biased parallelogram support linkage which is automatically operated upon mounting and dismounting of a step by a user to swing the step between an inward raised storage position thereof and an outward lowered position of use. Engageable holding structure interposed in the swing path of the linkage blocks movement of the latter when the step is in the use position and maintains such linkage in an inclined position to impose a stabilizing force on the step, thereby securely holding the step in the use position thereof without fear of shifting or instability. In one form, the step assembly is adapted to be mounted between a door opening and a chassis frame of a vehicle in a manner which discourages theft thereof, while another form of the step assembly is adapted for mounting on a swingable tailgate of a pickup truck.

5 Claims, 4 Drawing Figures

STEP FOR VEHICLES

TECHNICAL FIELD

This invention generally relates to safety step assemblies especially for use with large vehicles such as trucks, and deals more particularly with a safety step which is automatically shiftable between a raised storage position and a lowered position of use upon mounting or dismounting thereof by a user.

Safety step assemblies for trucks, recreational vehicles, or the like are well known in the art. These assemblies generally include a step having linkage structure coupled thereto for permitting the step to be shifted from a raised, storage position to a lowered position of use. In some prior art constructions, the step is manually moved to the use position thereof, after which the step can be mounted to facilitate entry and exit from the associated vehicle. In safety step constructions wherein the step is suspended from the vehicle, considerable structure has been devoted for the purpose of stabilizing the step in its lowered position of use to prevent shifting of the step when the latter is mounted by a user. This additional stabilizing structure usually takes the form of heavy linkage assemblies and support members which, of course, increases the cost and complexity of these units. Still other step constructions of the suspended variety have resorted to various types of locking mechanisms to hold the step in a use position, which mechanisms must be separately operated when a user mounts or dismounts the step. A step assembly of the last mentioned type is disclosed in U.S. Pat. No. 2,575,615, which employs a pair of stationarily mounted clips for releasably holding a rod carried by the shiftable step linkage in order to reliably hold the step in a stable manner in the use position thereof. This arrangement is undesirable, particularly when used with tall truck cabs for example, since after boarding the vehicle, the user is forced to reach down and disengage the locking mechanism in order to allow retraction of the step; naturally this procedure is not only troublesome but is also unsafe for the user and can lead to damage to the step assembly if the user forgets to retract the step. Similarly when it is desired to deboard the vehicle, the user must reach down and manually disengage another locking mechanism dedicated to holding the step in a raised storage position in order to permit lowering of the step.

From the foregoing, it can be appreciated that there is a clear need in the art for a step assembly of relatively simple construction which provides for automatic raising and lowering of the step upon mounting and dismounting thereof by a user without the need for manipulating locking mechanisms while also assuring that the step is maintained in steady, stabilized manner when in the lowered use position thereof.

DISCLOSURE OF INVENTION

The present invention provides a safety step assembly which is particularly simple in construction, and therefore highly economical from a manufacturing standpoint, but yet which provides a rigid stabilized step that is automatically swingable between a raised, storage position, and a lowered position of use in response to the mounting or dismounting thereof by a user. A pair of opposing, spring biased telescoping mounting brackets removably mount the step assembly on a truck or the like without the need for permanent securement means such as bolts. Parallelogram linkage swingably mounts a safety step from the mounting brackets for combined elevational and horizontal movement between the raised, storage position and a lowered position of use. Engageable support structure interposed in the swing path of the linkage is operative to limit the downward swinging movement of the step and transfers a portion of the user's weight delivered through the linkage to the vehicle, thereby rigidifying the linkage and step when the latter is mounted, while spring loading of the linkage produces automatic retraction of the step to its raised, storage position when the step is dismounted. In one form of the invention, the mounting brackets are particularly adapted to removably mount the step assembly on the tailgate of a pickup truck, while another form of the invention includes mounting brackets for removably mounting the step assembly between a door opening and chassis frame of a vehicle in a manner which discourages theft of the step assembly while also assuring that the safety step assumes a horizontal position of installation.

BEST MODE FOR CARRYING OUT THE INVENTION

Figure 1:
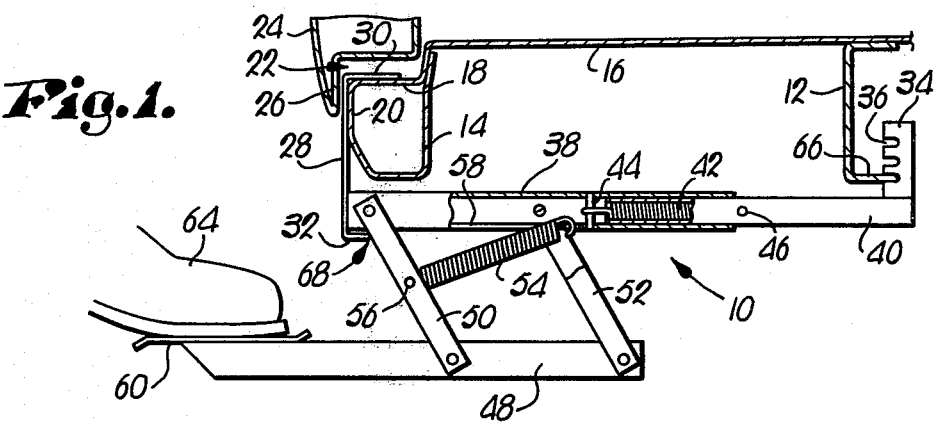
FIG. 1 is a longitudinal sectional view of the step assembly which forms the currently preferred form of the invention, portions thereof being broken away for clarity, shown in the lowered, use position thereof and installed in operative relationship to a door of a vehicle.
Figure 2:
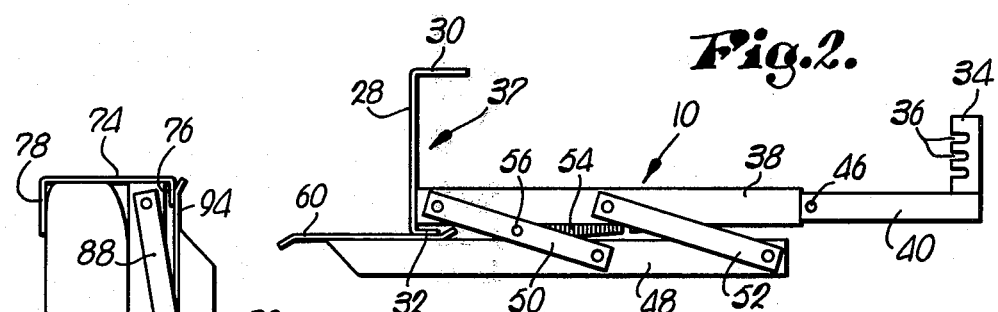
FIG. 2 is a side elevational view of the step assembly shown in FIG. 1, with the step thereof raised to its storage position.
Figure 3:
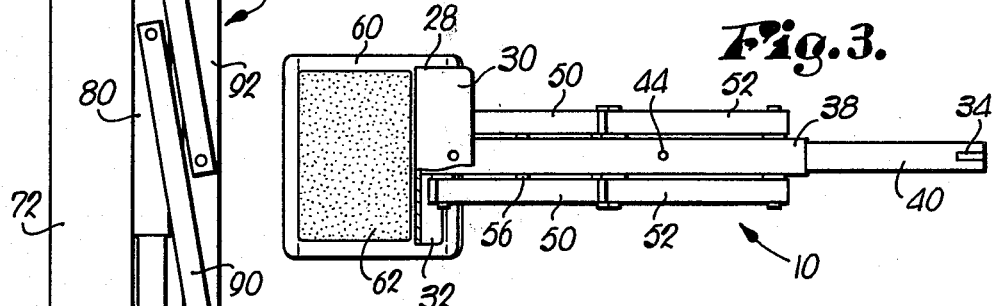
FIG. 3 is a top plan view of the step assembly shown in FIG. 2.

Referring initially to FIGS. 1 through 3, a step assembly generally indicated by the numeral 10 is adapted to be removably secured between a longitudinal chassis frame member 12 and a door frame opening defined by door sill channel 14 beneath the floorboard 16 of a truck or the like. The door sill channel 14 includes a pair of perpendicular sides 18 and 20 respectively which are adapted to be received within a cutout area 22 in a swingably mounted door 24, which cutout portion 22 is defined, in part, by a lip portion 26 partially overlapping the side 20 of the channel 14.

The step assembly 10 includes a first, vertically extending, U-shaped mounting bracket 28 provided with an upper, horizontally extending flange edge 30 as well as a lower engageable supporting edge 32, and a second vertically extending, mounting bracket 34 provided with a plurality of vertically spaced, notches 36 therein. The base side of bracket 28 is secured as by welding to one extremity of a tubular support member 38, the opposite extremity of member 38 being adapted to slidably receive therethrough, in telescoping fashion, support member 40 which has bracket 34 mounted on one extremity thereof distal from the support member 38.

Biasing means comprising a helical tension spring 42 is disposed within one end of the support member 40 and has the opposite extremities thereof respectively secured to the support members 38 and 40 by means of holding pins 44 and 46 passing through the sidewalls of the corresponding support members 38 and 40. At this point, it can be appreciated that the brackets 28 and 34 present a pair of shiftable opposing openings 36 and 37 which may receive associated portions of a vehicle therewithin in order to fasten the step assembly 10 to such vehicle.

An elongate, step extension arm 48 extends transversely with respect to the channel 14 and frame member 12 and is mounted for transverse swinging movement beneath the support member 38, in vertical alignment with the latter, by means of two pairs of parallel link elements 50 and 52, having the respective opposite extremities thereof journaled in the support member 38 and extension arm 48, on opposite sides of each of the latter. As best seen in FIGS. 1 and 2, it can be appreciated that the link elements 50 and 52 in combination with the support member 38 and extension arm 48 form a parallelogram type linkage for shiftably mounting a latter discussed step 60 on the vehicle. A helical tension spring 54 has one extremity thereof secured between central stretches of the link elements 50 by means of a connecting rod 56 extending between the latter, while the opposite end of the spring 54 is secured to central stretches of the support member 38. Tubular support member 38 includes a cutout portion 58 extending longitudinally through central stretches thereof to receive the spring 54 therewithin, as shown in FIG. 2. The step extension arm 48 has mounted on the upper surface of one extremity thereof, by any suitable means such as welding, a horizontally extending platform or step 60 which may include a layer of nonskid material 62 applied to the upper surface thereof which is adapted to be engaged by a user's foot 64. Step 60 extends along the length of extension arm 48 a sufficient distance to contact the engageable supporting edge 32 when the combination of the extension arm 48 and step 60 are in the raised, storage position thereof as shown in FIG. 2. The engageable supporting edge 32 comprises a blocking member which extends transversely across each of the link elements 50 and is disposed within the swinging path of the latter when the link elements rotate about their respective pivotal mountings in the support member 38. The supporting edge 32 extends inwardly toward the frame member 12 a sufficient distance to engage upper edge portions of the link elements 50 at a contact area 68 whereby to maintain such link elements 50 inclined from vertical when the step 60 is in the lowered use position thereof, as shown in FIG. 1.

The step assembly 10 may be simply and rapidly installed between the door 24 and chassis frame member 12 in the following manner. The step assembly 10 is first disposed beneath the floorboard 16 and one of the plurality of notches 36 in the second mounting bracket 34 is guided over an inwardly turned flange edge 66 of the frame member 12. At this point, the support member 40 is retracted within the support member 38 by virtue of the spring 42 so that the edge 30 of the first mounting bracket 40 does not extend sufficiently outward to clear the side 20 of the door sill channel 14, consequently, member 38 must be urged outwardly away from the member 40, against the tension force imposed by spring 42 until the edge 30 clears side 22 and may be slipped over the door sill channel 14 with the edge 30 abuttingly contacting side 18 of the door sill channel 14. With the step assembly thus installed, the vertical base side of the first mounting bracket 28 is urged into contact with side 20 of the door sill channel 14 by virtue of the tension force produced by the spring 42, and cooperates with the flange edge 30 and second mounting bracket 34 to securely hold the step assembly 10 in place. Prior to being mounted by a user, the step 60 and extension arm 48 assume a raised, storage position due to the tension loading on the link elements 50 created by the spring 54, and it may be appreciated that the upward travel of step 60 is limited by the engageable supporting edge 32 which contacts the latter, as best seen in FIG. 2. With the step 60 in the raised, storage position thereof it may be appreciated that the step 60 is disposed in a horizontal position and extends outwardly from the first U-shaped mounting bracket 28 a sufficient distance to allow a user to place his foot 64 thereupon. As the user places his foot 64 on the step 60 thereby mounting the same, spring 54 yields to the force imposed by the user's foot 64 and the parallel link elements 50 and 52 rotate about their pivotal mountings to produce rotary movement of the extension arm 48 and step 60 in a manner which both lowers the step 60 and shifts the latter outwardly from the raised, storage position thereof shown in FIG. 2 to the lowered, position of use thereof shown in FIG. 1. As the link elements 50 swing downwardly when the user mounts the step 60, upper edge portions of each of the link elements 50 simultaneously engage the engageable supporting edge 32 which maintains the link elements 50 in a position inclined from vertical as shown in FIG. 1. As the user imposes additional force on the step 60, a portion of such force is transferred through the link elements 50 onto the supporting edge 32 which in turn delivers such force to the vehicle. It can be readily appreciated that each of the link elements 50 functions as a force transmitting lever arm while the supporting edge 32 acts as a fulcrum which is in weight bearing relationship to such lever arms and therefore securely support the latter. Here, it is significant to observe that because the link elements 50 are maintained in an inclined position in weight transferring relationship to the supporting edge 32, the link elements 50 are urged by the downwardly directed force imposed by the user on the step 60 to swing in a clockwise direction, as viewed in FIGS. 1 and 2, around their upper pivotal mountings, consequently, the possibility of inward swinging movement (toward the frame member 12) of the step 60 and arm 48 is eliminated, thus, fore and aft stability of the step 60 is assured. Moreover, by virtue of the fact that the supporting edge 32 engages both of the link elements 50 on opposite lateral sides of the extension arm 48, it is evident that considerable lateral stability of the step 60 is also achieved.

Clearly then, with the step 60 in the lowered, position of use thereof, the supporting edge 32 engages portions of the link elements 50 at the contact areas 68 thereby rigidifying the step assembly 10 and holding the step 60 in a steady, stabilized manner to assure safe usage of the step assembly 10. It may be observed by virtue of the parallelogram linkage formed by the support member 38, extension arm 48, and link elements 50 and 52, that the extension arm 48 and thus the step 60 are maintained in a horizontal attitude throughout the swinging motion thereof between the stored and use positions, thereby providing a step which is particularly well adapted to be manipulated by the user's foot 64 in a single, smooth operation. Moreover, after the user dismounts the step 60, the latter is automatically returned to its raised, storage position without the need for further manual manipulation thereof by the user. In passing, it may be simply noted that the various notches 36 in the bracket 34 accommodate variations in the elevation between the side 18 of the door sill channel 14 and the edge 66 of the chassis frame member 12 in order to assure that the step assembly 10 is initially installed in a manner to position the step 60 horizontally.

As is evident from FIG. 2, the step assembly 10 provides a particularly compact structure which maximizes the clearance between the extension arm 48 and the ground therebelow. However, in the event that the user requires additional ground clearance beneath the associated vehicle, the step assembly 10 may be quickly and rapidly removed by simply moving the support member 38 outwardly away from the support member 40 against the tension produced by the spring 42 until the flange edge 30 clears the side 20 of door sill channel 14, whereupon members 38 and 40 may be telescopically collapsed and the second mounting bracket 34 may be disengaged from the edge 66 of the chassis frame member 12.

As a further important feature of the invention, even though the step assembly 10 may be simply and rapidly installed without the need for bolts, welding or the like, theft of the step assembly 10 is discouraged by virtue of the fact that the lip portion 26 of the door 24 overlaps portions of the base side and flange edge 30 of the first mounting bracket 28 thereby preventing the removal of such mounting bracket from the cutout space between the door 24 and the door sill channel 14, even in the event that the second mounting bracket 34 is disengaged from the chassis frame member 12.

Figure 4:
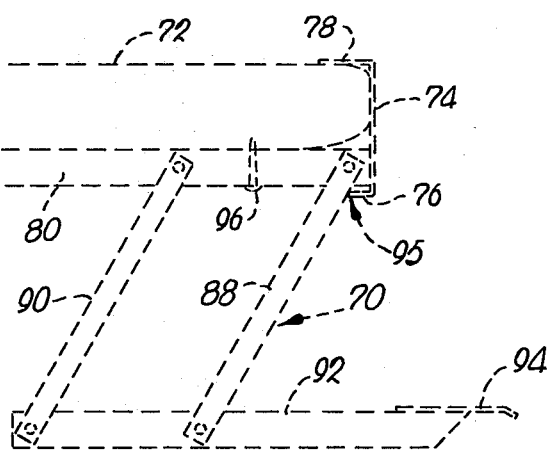
FIG. 4 is a side elevational view of an alternate form of the invention, showing a step assembly adapted for mounting on a swingable tailgate of a pickup truck, full lines indicating the relationship between the step assembly and the tailgate when the latter is in its closed, vertical position, the relationship between the step assembly and the tailgate when the latter is in its open, horizontal position being indicated in the phantom.

Turning attention next to another form of the invention which is quite similar in construction detail to the previously discussed step assembly 10, and referring now to FIG. 4, a step assembly 70 is adapted to be mounted on the rear of a swingably mounted tailgate 72 of a pickup truck (not shown). Step assembly 70 includes a first U-shaped mounting bracket 74 provided with an inwardly turned, engageable supporting edge 76 and a flange edge 78 adapted to be mounted over the upper extremity of tailgate 72. A first tubular support member 80 slidably receives therewithin, in a telescoping manner, a second tubular support member 82, which support members 80 and 82 may be urged toward each other by means of a biasing spring disposed therewithin (not shown), similar to the spring 42 associated with the step assembly 10. One extremity of the support member 80, distal from the support member 82 is secured as by welding to the base side of the first mounting bracket 74, while the extremity of support member 82 distal from the member 80 has secured thereto, as by welding, a hook member 84 adapted to receive therewithin the lower edge 86 of the tailgate 72. Two pairs of parallel link elements 88 and 90 are disposed on opposite lateral sides of the support member 80 and extension arm 92, and each have the opposite ends thereof respectively pivotally mounted on the support member 80 and extension arm 92. A step 94 is secured to the upper surface of one end of the extension arm 92, distal from the link elements 88 and 90. Although the previously mentioned spring (not shown) disposed within the tubular members 80 and 82 biases each of the latter toward each other to cause the brackets 74 and 84 to grippingly engage the upper and lower edges of the tailgate 72, the step assembly 70 may be further secured to the tailgate 72 by means of bolts 96 passing through the tubular support member 80 into the tailgate 72. From the foregoing, it is apparent that the step assembly 70 may be simply installed on the tailgate 72 by disposing either of the brackets 74 or 84 over the corresponding edge of the tailgate 72 and then drawing the tubular support members 80 and 82 apart until the other of such brackets 74 or 84 may be slipped over the associated edge of the tailgate 72, after which bolts 96 may be installed if desired.

In operation, with the tailgate 72 in its vertical, closed position, the step extension arm 92 along with step 94 assumes a closed, compact position with the outermost areas of the step 94 in engagement with the supporting edge 76. Upon lowering the tailgate 72 to its open, horizontal position, gravity urges the extension arm 92 along with step 94 away from the tailgate 72 whereupon step 94 disengages the supporting edge 76 and swings both downwardly and outwardly until edge portions 95 of link elements 88 contact the supporting edge 76 which limits the swinging movement of step 94 to a position well below the tailgate 72 and slightly spaced therebehind. As the user mounts the step 94, the downwardly imposed force thereupon is transmitted through extension arm 92 to the link element 88 tending to force the latter into the supporting edge 76 thereby locking the entire assembly into a rigid, stabilized unit while the user's foot remains on the step 94. After the user has dismounted the step 94, the latter is automatically shifted to its raised, closed position upon raising of the tailgate 72 to its vertical, closed position, due to the influence of gravity.

INDUSTRIAL APPLICABILITY

The construction details and operation of the invention have been made amply clear by the previous description thereof. In the preferred forms of the invention illustrted herein, the various structural components comprise a rigid steel stock of square cross section, however, it can be appreciated that suitable rigid stock having other cross sections may be satisfactorily employed.

From the foregoing, it is clear that the invention provides a compact, highly stable, automatically operated step assembly which is easily installed and is particularly economical from a manufacturing standpoint. Thus, it will be observed that the step assembly not only provides for the reliable accomplishment of the object of the invention, but does so in a particularly simple and economical manner. It is recognized, of course, that those skilled in the art may make various modifications or additions to the preferred embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

Having thus described the invention, what is claimed as new and desired to be secured by Letters Patent is:

1. Step apparatus for vehicles, including:
 parallel motion type mounting means having a normally upper member, means adapted for fastening said member to a vehicle, a normally lower arm, and swingable link means for suspending said arm from said member,
 said mounting means being shiftable between a storage condition thereof in which said arm is disposed adjacent said member and a use condition in which said arm is disposed further from said member and said link means are disposed in a position inclined generally downwardly and away from vertical toward one extremity of said arm;

a step carried by said arm adjacent the other extremity thereof; and means mounted on said upper member for blocking said link means against further swinging movement toward vertical when said mounting means is shifted from said storage condition thereof into said use condition thereof, whereby said link means are maintained by gravity in said inclined position thereof when said mounting means is in said use condition thereof and the weight of a user is applied atop said step, thereby automatically stabilizing and preventing shifting of said step when the latter is mounted by a user, without the need for a locking device.

2. The invention of claim 1, wherein:

said upper member includes a first elongate support element, and a second elongate support element slidably coupled with said first support element in telescoping fashion, and said fastening means includes bracket means respectively secured on the opposite, free extremities of said first and second support elements, said bracket means being shiftable toward and away from each other upon telescopic sliding of said first and second support elements to allow said bracket means to be shifted into and out of engage, holding relationship with portions of said vehicle whereby to removably fasten said step apparatus on said vehicle, said fastening means further including means for preventing said bracket means from shifting away from each other when the latter are in said engaged, holding relationship with said vehicle portions.

3. The invention of claim 2, wherein said bracket means includes:

a first bracket member having a base side and a leg forming an L-shaped configuration, said first bracket member being secured on the free extremity of one of said support elements and adapted for being interposed between a door and a door frame of said vehicle, and a second bracket member having a cutout opening therein adapted to receive frame portions of said vehicle therewithin, said second bracket member being secured on the free extremity of the other of said support elements.

4. The invention of claim 1, wherein:

said swingable link means includes first and second, spaced, parallel link elements each having one extremity thereof pivotally coupled with said lower arm and having the other extremity thereof pivotally coupled with said upper member whereby to form a parallelogram linkage.

5. The invention of claim 4, wherein said blocking means includes support structure extending transversely across the swing path of at least one of said pair of link elements.

* * * * *